United States Patent

Sewell, Jr.

[15] 3,648,258

[45] Mar. 7, 1972

[54] OPTICAL MEMORY CIRCUIT

[72] Inventor: Frank A. Sewell, Jr., Newton Centre, Mass.

[73] Assignee: Sperry Rand Corporation

[22] Filed: July 1, 1969

[21] Appl. No.: 838,279

[52] U.S. Cl. ..........................340/173 LS, 250/209, 317/238, 307/279

[51] Int. Cl. ..........................G11c 11/42, G11c 13/04

[58] Field of Search ..........................340/173; 250/209; 317/238

[56] References Cited

UNITED STATES PATENTS

| | | | |
|---|---|---|---|
| 3,435,138 | 3/1969 | Borkan | 340/173 |
| 3,474,417 | 10/1969 | Kazan | 340/173 |

*Primary Examiner*—Terrell W. Fears
*Attorney*—S. C. Yeaton

[57] ABSTRACT

A memory circuit contains a variable threshold transistor arranged to receive optically coded information from an external light source. A WRITE voltage pulse is applied between the gate electrode and the substrate during the WRITE interval. The source and drain elements of the transistor are left "-floating" during a WRITE interval whereupon the conduction threshold of the transistor assumes a level dependent upon the amplitude and duration of the WRITE voltage pulse and the intensity of the light received from the external source. Subsequently applied READ voltages produce a drain current having a magnitude indicative of the intensity of the light received during the occurrence of the WRITE voltage pulse.

9 Claims, 3 Drawing Figures

INVENTOR.
FRANK A. SEWELL JR
BY Joseph M. Roehl
ATTORNEY

OPTICAL MEMORY CIRCUIT

The invention described herein was made in the performance of work under a NASA contract and is subject to the provisions of section 305 of the National Aeronautics and Space Act of 1958, Public Law 85-568 (72 STA. 435; 42 U.S.C. 2457).

BACKGROUND OF THE INVENTION

1. Field of the Invention

The invention relates to logical memory circuits and more particularly to memory circuits for producing electrical readout signals in response to previously recorded optically coded signals.

2. Description of the Prior Art

Light responsive memory circuits are known in the prior art. These circuits require an optical sensing device such as a reverse biased PN-junction to detect light and a separate storage device for storing the desired data.

This requirement for separate detection and storage presents a difficulty when a multitude of such prior art circuits are to be incorporated into a large integrated circuit.

Furthermore, such prior art memories usually are limited to either a digital or analog mode of operation. A basic circuit for one mode of operation cannot be easily modified for operation in the other mode of operation.

SUMMARY OF THE INVENTION

The present invention employs a variable threshold transistor memory element in the form of an insulated gate field effect transistor having a plural-layered dielectric between the gate and semiconductor substrate. An external source of optically coded signals is arranged to illuminate the substrate of the transistor in the region beneath the gate, during a WRITE interval. By applying a WRITE voltage pulse of known characteristics between the gate and substrate and leaving the source and drain elements of the transistor floating during a WRITE interval, the rate of minority carrier generation in the space charge region of the substrate becomes a function of the intensity of the coded optical signal. The rate of minority carrier generation controls the rate at which the space charge collapses. The rate at which the space charge collapses determines the rate at which the voltage appearing across the insulator is restored to the full voltage applied to the device. Thus, the amount of charge stored in the variable threshold transistor memory element depends on the value of the information contained in the coded optical signal.

DESCRIPTION OF THE PREFERRED EMBODIMENT

Copending patent application Ser. No. 767,230, filed in the name of Horst A. R. Wegener and assigned to the present assignee concerns an MNS (metal-nitride-silicon) variable threshold transistor that may be used as a memory element. The variable threshold transistor includes conventional source and drain electrodes formed on a semiconductor substrate. A gate electrode is electrically insulated from the substrate by a plural-layered dielectric in which the individual layers have different electrical conductivities.

A voltage applied between the gate and substrate can cause charge to accumulate at the interface between dielectrics. The conduction threshold of the transistor is determined by the amount of stored charge. Thus, the conduction threshold of the transistor can be varied by adjusting the magnitude, polarity, or duration of the voltage pulse. The conduction threshold can be later determined by applying a pulse of somewhat smaller magnitude to the gate electrode and observing the source to drain current flow.

The present invention further makes use of the fact that semiconductor substrate materials of the type herein considered are sensitive to light. This phenomenon is explained, for instance, in an article entitled "Influence of Illumination on MIS Capacitances in the Strong Inversion Region," by J. Grosvalet and C, Jund appearing in the IEEE Transactions ED-14, page 777 for 1967.

Figure 1:
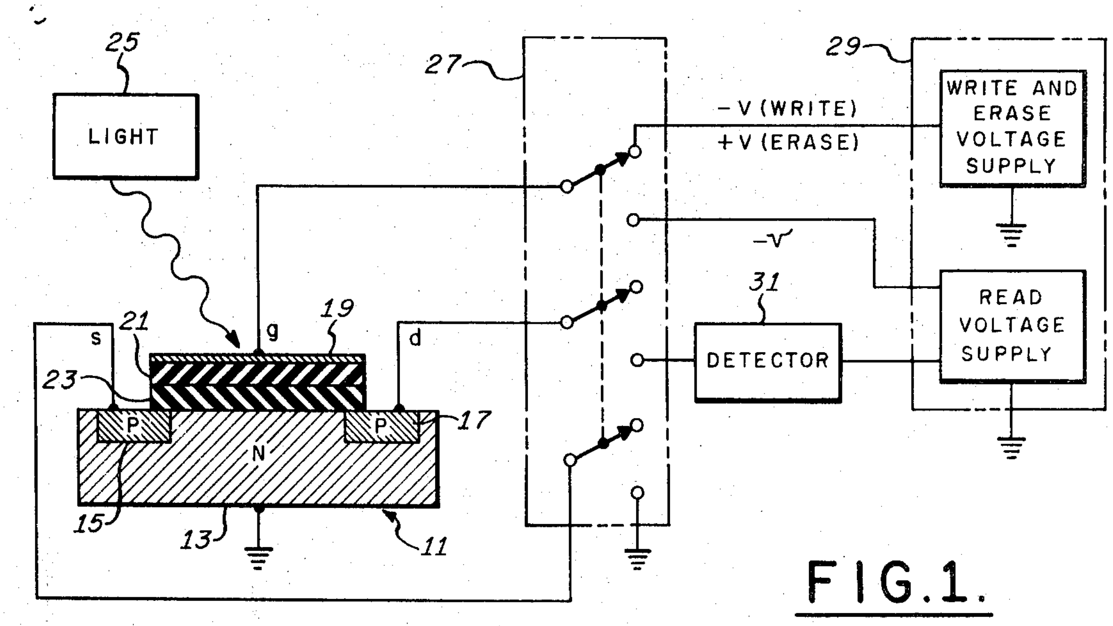
FIG. 1 is a schematic diagram illustrating a presently preferred embodiment of the invention.

The means by which this light sensitivity is used in the present invention may be understood by referring to FIG. 1. An MNS variable threshold transistor 11 contains an N-doped semiconductor substrate 13 and source and drain regions 15 and 17. A gate electrode 19 is separated from the substrate 13 by means of a first dielectric layer 21 and a second dielectric layer 23. Light from a source 25 impinges on the transistor and illuminates a substrate 13. The source, drain and gate electrodes are connected to a READ-WRITE switch 27 and energized from a voltage supply 29. The switch 27, when positioned as shown, applies a WRITE voltage from the supply 29 during a WRITE interval and also isolates the source and drain electrodes from the voltage supply during this interval. This permits the source and drain electrodes to remain floating during the WRITE interval.

When information is to be read out of the variable threshold transistor 11, the switch 27 is thrown downward into the READ position. The gate electrode is then connected to the READ voltage supply, the source is grounded and the drain is connected through a current detector 31 to the READ voltage supply.

In a typical circuit, the WRITE voltage supply provides a −40-volt pulse of approximately 1-millisecond duration to the gate electrode. This is designated as a −V voltage in FIG. 1.

During the READ interval, the READ voltage supply typically provides a −10-volt pulse, designated as a −V voltage in FIG. 1, to the gate electrode and a −10-volt bias to the drain electrode through the detector 31. ·

The detector 31 is used for monitoring current. This detector may be any suitable current detection device such as an oscilloscope or current responsive circuit.

During the ERASE interval, the WRITE voltage is applied with the reversed polarity, designated as a +V voltage in FIG. 1. The ERASE process returns the threshold of the transistor to the value it had prior to the WRITE cycle and thus prepares the circuit for a new WRITE cycle. The ERASE cycle is independent of the incident light intensity and can take place with the source and drain floating or connected since the ERASE polarity does not form a space charge region in the semiconductor.

The gate 19 of the transistor is preferably formed from a transparent material to provide maximum light transmission to the substrate. However, suitable operation has been observed with opaque gate materials. The action with the opaque material is not fully understood. However, this action is apparently caused by a light guide phenomenon wherein light leaks around the edge of the gate and through internal reflection finds its way into the substrate.

Partially transparent gate electrodes have been formed from thin layers of tin oxide. Thin layers of other material such as gold may also be used for this electrode.

In general, the voltage supply must provide voltages that tend to create an inversion region in the substrate material according to well-known principles. Thus, a negative voltage is required for the N-type substrate depicted in FIG. 1. Conversely, a P-type substrate would require positive voltages from the supply. Application of the WRITE voltage sweeps out minority carriers from beneath the gate so as to form a space charge region. Since the source and drain elements are floating during this interval, they do not act as a source of minority carriers to form an inversion layer. Thus, the field lines from the gate electrode must terminate on the donor or acceptor sites in the semiconductor substrate material, forming a space charge region across which a considerable voltage drop may occur. Thus, the entire applied voltage no longer appears across the insulator material, but is divided between the dual insulator and the space charge. The rate at which the space charge voltage disappears depends on the rate at which minority carriers are generated in the space charge region and are swept to the silicon-insulator interface. As this process takes place, more and more field lines can terminate on the inversion layer that is forming, so that the space charge voltage is reduced. Thus, the time it takes to reduce the space charge voltage and thereby increase the insulator voltage is related to the time that the charging process is delayed. But the rate at which minority carriers are generated in the space charge region can be controlled by the intensity of light impinging on the substrate space charge region. Light incident on the space charge region generates additional minority carriers which contribute to the collapse of the space region. Therefore, the light intensity controls the charging time.

In general, the charge stored by an MNS variable threshold transistor serves to shift the conduction threshold of the device. The magnitude of the shift is determined by the amount of charge being stored. For the reasons explained above, the amount of this shift increases with increasing intensity of illumination of the substrate during the WRITE interval. The effects of the phenomenon can be understood by referring to FIG. 2.

Figure 2:
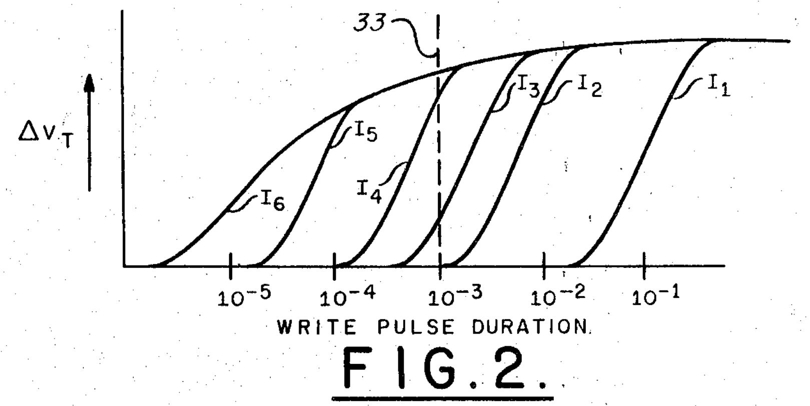
FIGS. 2 and 3 are graphs useful in explaining the operation of the invention.

FIG. 2 is a plot of shift in conduction threshold as a function of WRITE pulse duration with light intensity as a parameter.

For a comparatively low intensity of light $I_1$, the shift in conduction threshold is not significant until the pulse duration exceeds 0.01 seconds. With a comparatively high-level intensity, $I_6$, however, the shift in conduction threshold becomes apparent with short duration pulses less than $10^{-5}$ seconds.

In a typical memory circuit, a WRITE pulse duration of $10^{-3}$ millisecond may be used. Under these circumstances, if a READ voltage is applied as indicated by the dashed line 33, no shift in conduction threshold will be apparent if the light intensity had been equal to or less than an intensity $I_2$. If a light having an intensity of $I_4$ had been applied during the WRITE interval, however, a large shift in conduction threshold would have occurred. An intermediate level of intensity $I_3$ would cause an intermediate shift in conduction threshold. In circuits in which a binary memory is required, levels of intensity corresponding to $I_2$ and $I_4$ could be used to represent the two binary values.

In a practical circuit for use in a digital system, the light source 25 could be arranged to provide light having an intensity equivalent to $I_4$ to represent a binary ONE and to remain darkened to represent a binary ZERO.

In an analog system, the light source 25 would be energized so that the intensity of the light would vary in accordance with the magnitude of the signal to be stored. In an analog system, the stored information could be conveniently read out by varying the READ voltage until a specified drain current is produced.

Figure 3:
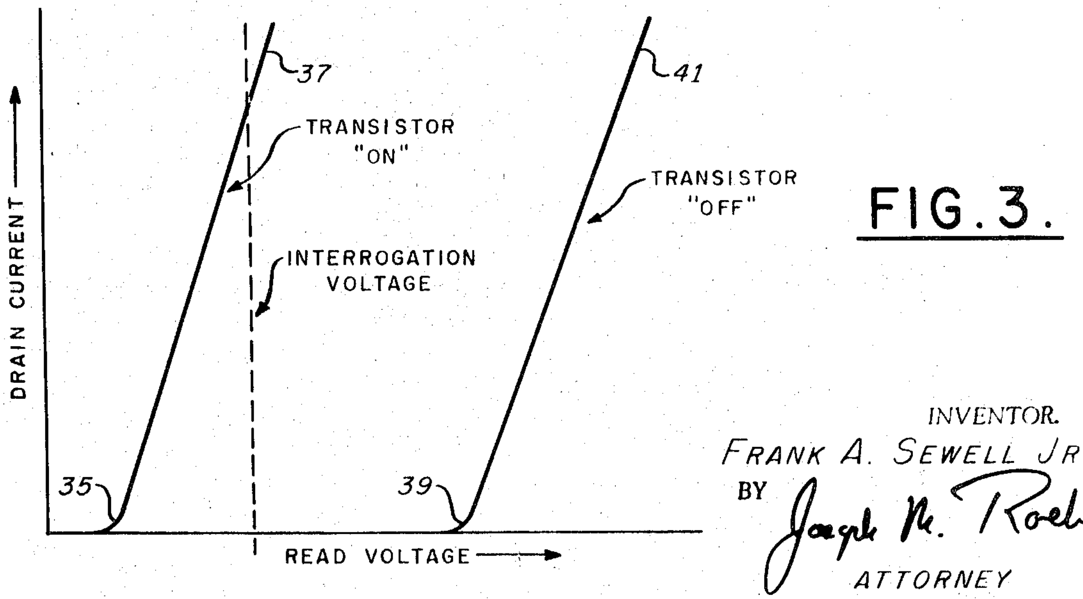

The operation of the circuit of FIG. 1, when used in a digital mode, can be visualized with the aid of FIG. 3, which represents a plot of drain current versus READ voltage for a variable threshold transistor when storing two different values of information. If the transistor substrate had not been illuminated during the WRITE interval, the conduction threshold 35 would not be shifted and the resultant curve 37 would define the drain current characteristic as a function of READ voltage. If, however, the transistor substrate had been illuminated during the WRITE interval, the conduction threshold would have been shifted to a point 39 so that the drain current characteristic would be represented by a curve 41.

If now, the READ voltage is applied at the indicated interrogation voltage level, a relatively high drain current will appear if the transistor is "ON," i.e., if the transistor had not been illuminated during the READ interval. If, however, the transistor had been illuminated, the transistor would be "OFF," i.e., no drain current would flow as a result of the interrogation voltage.

It will be appreciated that the circuit of FIG. 1 illustrates a basic embodiment of the invention. In a practical circuit, numerous individual memory cells controlled by more elaborate switching means, such as solid state switches, would be employed.

Although a "P-channel" transistor employing an N-doped semiconductor substrate has been illustrated, P-doped semiconductor device can be employed if desired.

I claim:

1. Memory apparatus for providing an electrical readout signal during a READ interval that represents optically coded information received by said apparatus from an external light source during a previous WRITE interval, said apparatus comprising:

a voltage supply, an insulated gate field effect transistor having source and drain elements formed in a semiconductor substrate and a gate electrode insulated from said substrate by a plural-layered dielectric, said transistor having a conduction threshold established by application of a WRITE voltage from said supply, said WRITE voltage having a value above a certain magnitude and being applied between said gate electrode and said substrate, said transistor being constructed and arranged so that light from said external source illuminates said substrate, switching means for applying voltages from said supply to said transistor, means in said switching means for applying a WRITE voltage to said gate electrode during a WRITE interval, means in said switching means for isolating said source and drain elements from said voltage supply whenever a write voltage is being applied to said gate electrode, means to apply a READ voltage to said gate electrode during a READ interval, indicating means, and means in said switching means for applying a bias voltage through said indicating means to said source and drain elements during a READ interval.

2. The apparatus of claim 1 wherein the WRITE voltage is a pulse of predetermined duration and amplitude and wherein the READ voltage has an amplitude less than the amplitude of said WRITE voltage.

3. The apparatus of claim 2 wherein the polarity and amplitude of the WRITE voltage are adjusted to create an inversion region in the substrate material.

4. The apparatus of claim 3 wherein the substrate is an *n*-doped semiconductor and the WRITE and READ voltages have a negative polarity.

5. The apparatus of claim 4 wherein the gate electrode and plural-layered dielectric permit passage of light directly from said external source to said substrate.

6. The apparatus of claim 2 for use in a binary coded system wherein the intensity of light from said external source can be switched between first and second levels to represent first and second binary values respectively.

7. The apparatus of claim 6 wherein said external source is illuminated to a predetermined intensity in response to a binary digit of one value and darkened in response to a binary digit of a second value.

8. The apparatus of claim 7 wherein said predetermined intensity is switched to cause a desired shift in the threshold voltage in said transistor and wherein said READ voltage is less than the shifted threshold voltage.

9. A memory circuit for providing an electrical readout signal indicative of optically coded information previously received by said apparatus from an exterior light source comprising:

* * * * *